Sept. 19, 1933.   I. S. SAMMONS   1,927,135
ELECTRIC CUTTING TORCH
Filed June 10, 1932   2 Sheets-Sheet 1
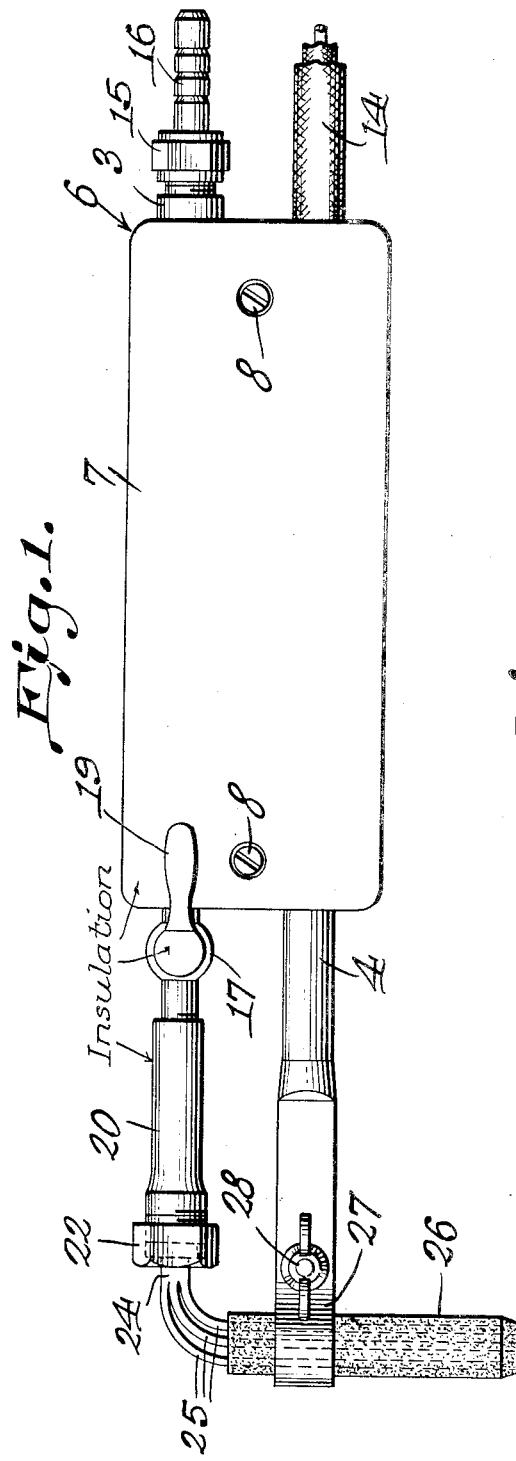
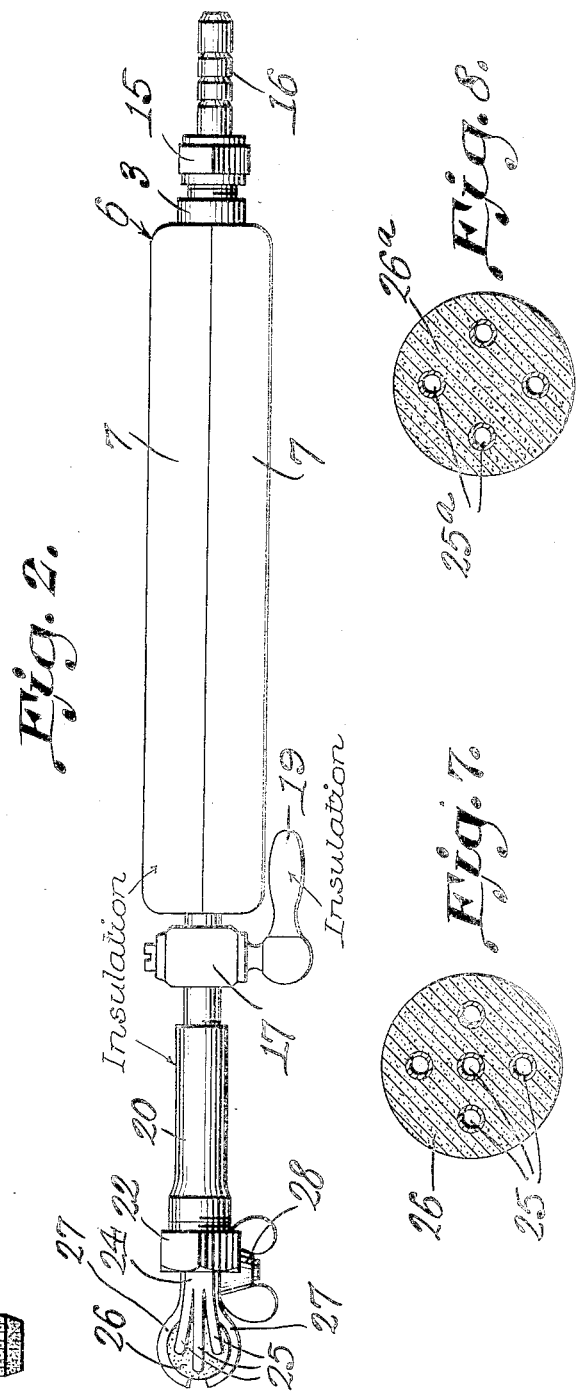
I. S. Sammons Inventor Sept. 19, 1933.  I. S. SAMMONS  1,927,135
ELECTRIC CUTTING TORCH
Filed June 10, 1932   2 Sheets-Sheet 2
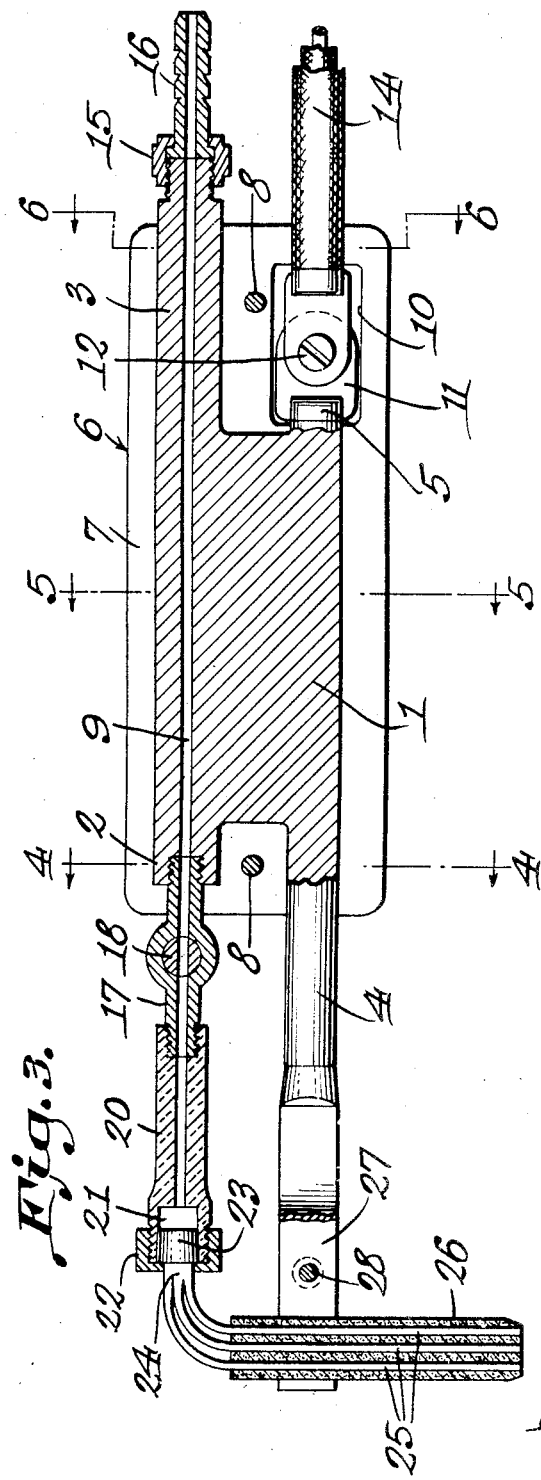
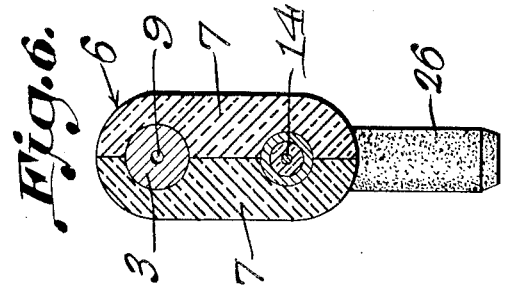
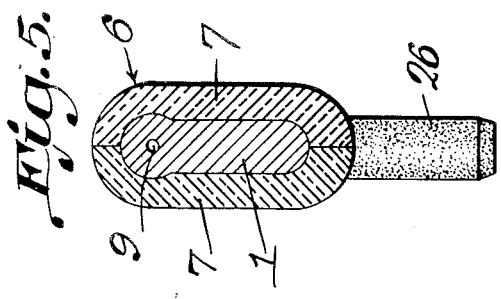
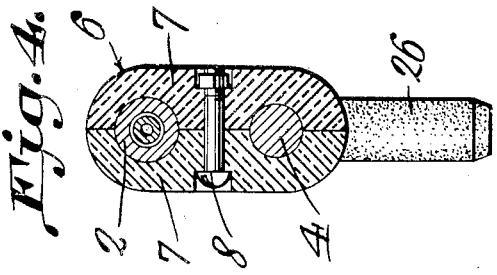
I. S. Sammons Inventor Patented Sept. 19, 1933

1,927,135

UNITED STATES PATENT OFFICE 1,927,135

ELECTRIC CUTTING TORCH

Ira S. Sammons, Pittsburg, Kans.

Application June 10, 1932. Serial No. 616,521

1 Claim. (Cl. 219—15)

This invention aims to provide a simple but effective torch whereby metal may be cut by a combination of electric arc fusion and oxygen flame.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a device constructed in accordance with the invention;

Fig. 2 is a top plan;

Fig. 3 is a longitudinal section, wherein parts are broken away, parts being in section;

Fig. 4 is a cross section on the line 4—4 of Fig. 3;

Fig. 5 is a cross section on the line 5—5 of Fig. 3;

Fig. 6 is a cross section on the line 6—6 of Fig. 3;

Fig. 7 is a cross section through the welding point;

Fig. 8 is a cross section through the welding point, this view showing a modification.

In carrying out the invention, there is provided a metal body 1, supplied at one end with a neck 2, and at its opposite end with a stem 3. At that end of the body 1 which has the neck 2, the body is supplied with a shank 4. At the end of the body opposite to the shank 4 there is a lug 5.

The numeral 6 designates an insulating grip, which may be variously constructed, without departing from the spirit of the invention. As shown, but not of necessity, the grip 6 comprises oppositely disposed members 7, held together by securing elements 8. The body 1 is housed in the grip 6, as is also the neck 2 on the body. The shank 4 projects out of the grip 6, and the stem 3 likewise projects out of the grip. The lug 5 extends into a cavity 10 formed in the members 7 of the grip 6. The lug 5 has an ear 11 located in the cavity 10 and connected by securing element 12 to a conductor 14 which extends out of the body. A nut 15 holds a connection 16 on the exposed end of the stem 3, the connection 16 being adapted to receive the tube (not shown) by which the oxygen is supplied.

A valve casing 17 extends into the grip 6 and is threaded or mounted otherwise in the neck 2. A valve 18 is mounted in the valve casing 17 and is provided with an insulating handle 19. The bore of the valve casing 17 communicates with a bore 9 in the body 1, and this bore is in communication with the connection 16. The numeral 20 marks an extension, preferably made of insulating material, and threaded on the end of the valve casing 17. In its outer end, the extension 20 has a tapered recess 21. A collar 22 is threaded on the extension 20 and retains a plug 23, of tapered form, in the recess 21.

The plug 23 has a tubular portion 24, from which extends a plurality of pipes 25, preferably made of copper, the pipes 25 being arranged at right angles to the extension 20 and the bore 9. The pipes 25 are embedded in a point 26, preferably made of carbon. The pipes 25 may be arranged as desired. In Fig. 7, four of them are shown as located about a central pipe. In Fig. 8, parts hereinbefore described have been designated by numerals previously used, with the suffix "a". In this form of the invention, there are but four of the pipes 25a, the central pipe of Fig. 7 being omitted. Fig. 8 will make it manifest that the pipes may be arranged as desired in the carbon point 26a.

The point 26 is disposed at right angles to the shank 4. The shank 4 terminates in compressible jaws 27 which grip the point 26 under the influence of a clamping device 28, such as a bolt and wing nut.

In practical operation, the oxygen or other fluid passes through the connection 16 and the bore 9, into the valve casing 17, the flow being governed by manipulating the valve 18 through the instrumentality of the handle 19. The oxygen passes through the extension 20, into the recess 21, through the tubular portion 24 of the plug 23, and through the pipes 25 that are embedded in the carbon point 26. The heat produced by the burning oxygen at the working end of the point 26, of course, aids in cutting the metal.

The current passes through the conductor 14, the ear 11, the body 1, the shank 4, the jaws 27 and the point 26, an arc being produced at the working end of the point 26. The general construction of the device is such that, in a simple and efficient structure, is combined all the advantages of an oxygen cut and an electric arc cut, working at the same point of application.

Having thus described the invention, what is claimed is:

A torch of the class described, comprising a solid, block-like body, made of conducting material, and provided at one end with an outwardly extended shank having gripping jaws under the control of an operator, the body being provided at its opposite end with an outwardly extended stem, and being provided at said opposite end with a projecting member carrying means for holding a conductor, an insulating grip housing the body, and comprising separable parts, means spaced from the body for holding said parts of the grip about the body, the grip having a recess receiving and housing the said projecting member and its conductor holding means, the shank and the stem extending out of the grip, a cutting point releasably held in the jaws, a pipe extended longitudinally through the point, the body having a longitudinal bore extended through the stem, and means mounted on the body, and including a valve external to the grip, for connecting the pipe releasably to the body, in communication with the bore.

IRA S. SAMMONS.